United States Patent
Wadhwa et al.

(10) Patent No.: US 12,321,332 B2
(45) Date of Patent: Jun. 3, 2025

(54) SYSTEM AND METHOD FOR DEVICE CONFIGURATION DATA GENERATION AND MANAGEMENT VIA A MACHINE LEARNING ENGINE

(71) Applicant: BANK OF AMERICA CORPORATION, Charlotte, NC (US)

(72) Inventors: Vishal Wadhwa, Telengana (IN); Mangesh Narendra Chore, Telengana (IN); Sunil Reddy Gaddam, Telengana (IN); Aditya Anil Kulkarni, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/232,567

(22) Filed: Aug. 10, 2023

(65) Prior Publication Data
US 2025/0053554 A1  Feb. 13, 2025

(51) Int. Cl.
G06F 16/00 (2019.01)
G06F 16/23 (2019.01)
G06F 16/25 (2019.01)

(52) U.S. Cl.
CPC ........ G06F 16/2358 (2019.01); G06F 16/254 (2019.01)

(58) Field of Classification Search
None
See application file for complete search history.

(56) References Cited

U.S. PATENT DOCUMENTS

| | | | |
|---|---|---|---|
| 7,987,254 B2 | 7/2011 | Kruchinin et al. | |
| 8,024,488 B2 * | 9/2011 | Salowey | H04L 9/32 710/10 |
| 8,069,275 B2 | 11/2011 | Peck et al. | |
| 8,819,771 B2 | 8/2014 | Biazetti et al. | |
| 9,880,836 B2 | 1/2018 | Van Dorsselaer | |
| 10,114,346 B2 | 10/2018 | Moddemann et al. | |
| 10,664,264 B2 | 5/2020 | Garvey et al. | |
| 10,949,218 B2 | 3/2021 | Antonio et al. | |
| 11,200,139 B2 | 12/2021 | Singh et al. | |
| 12,132,716 B2 * | 10/2024 | Isaacs | G06F 9/54 |
| 2007/0005320 A1 | 1/2007 | Hydrie et al. | |

(Continued)

OTHER PUBLICATIONS

Hitchcock et al., "For Account Management Method And System For Multiple Network Sites", Apr. 16, 2019, CN-107659577-B, 56 pages. (Year: 2019).*

*Primary Examiner* — Bai D Vu
(74) *Attorney, Agent, or Firm* — Moore & Van Allen PLLC; Andrew T. Wood

(57) ABSTRACT

Systems, computer program products, and methods are described herein for device configuration data generation and management via a machine learning engine. The present invention is configured to receive credentials on an interface of an endpoint device, receive a request from the endpoint device to access a portal, authenticate the credentials via an authentication engine, receive specifications, wherein the specifications are input into the interface of the endpoint device, select, via a configuration engine comprising pre-existing configurations in a configuration database of a first storage device, a selected pre-existing configuration, determine a verification of the selected pre-existing configuration, and access the portal.

14 Claims, 9 Drawing Sheets

(56) References Cited

U.S. PATENT DOCUMENTS

| | | |
|---|---|---|
| 2007/0094641 A1 | 4/2007 | Darr et al. |
| 2017/0034023 A1* | 2/2017 | Nickolov ............ H04L 43/0817 |
| 2019/0050557 A1 | 2/2019 | Martin et al. |
| 2020/0045519 A1* | 2/2020 | Raleigh ............... H04M 15/765 |
| 2022/0327012 A1 | 10/2022 | Srinivasan et al. |
| 2023/0076276 A1 | 3/2023 | Parthasarathi et al. |
| 2023/0164029 A1 | 5/2023 | Mermoud et al. |
| 2023/0300025 A1 | 9/2023 | Fink et al. |

* cited by examiner

SYSTEM AND METHOD FOR DEVICE CONFIGURATION DATA GENERATION AND MANAGEMENT VIA A MACHINE LEARNING ENGINE

FIELD OF THE INVENTION

The present invention embraces a system for device configuration data generation and management via a machine learning engine.

BACKGROUND

In the modern entity technology landscape, multiple types of devices are utilized to support various functions, ranging from security and network devices to storage devices and applications. As per enterprise requirements, these devices, whether physical or virtual, undergo frequent scaling and upgrades. Within these devices, multiple accounts with different levels of permissions and access are used to manage and share information among collaborating teams. However, this approach poses significant security vulnerabilities from an Identity and Access Management (IAM) standpoint. The persistent access to these devices becomes a potential vulnerability and implementing a continuous monitoring approach proves to be highly challenging. Additionally, the current vaulting solutions require manual intervention to configure device settings for managing accounts. Furthermore, managing and connecting diverse devices in a large environment can be complex and challenging. The manual management of these devices not only exposes vulnerabilities of sharing confidential information and compromising data integrity but also increases the likelihood of errors. Moreover, the testing and certification process for devices demand substantial manual efforts before their accounts can be securely vaulted and deployed. Accordingly, there is a need for a system and method for device configuration data generation and management via a machine learning engine.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for selective data routing in a distributed network via data throughput analysis in a distributed ledger network is presented. The system may include a processing device, and a non-transitory storage device including instructions that, when executed by the processing device, causes the processing device to perform the steps of: receive credentials on an interface of an endpoint device, receive a request from the endpoint device to access a portal, authenticate the credentials via an authentication engine, receive specifications, wherein the specifications are input into the interface of the endpoint device, select, via a configuration engine comprising pre-existing configurations in a configuration database of a first storage device, a selected pre-existing configuration, determine a verification of the selected pre-existing configuration, and access the portal.

In some embodiments, in response to determining that the selected pre-existing configuration is verified, the instructions further cause the processing device to update the configuration database with the specifications.

In some embodiments, in response to not determining that the selected pre-existing configuration is verified, the instructions further cause the processing device to extract and transmit the specifications to a configuration generator engine including a machine learning engine, preprocess and extract relevant specification data from the specifications, generate, using the machine learning engine, a generated configuration based on and the relevant specification data, wherein the machine learning engine is trained on the pre-existing configurations, and determine a verification of the generated configuration.

In some embodiments, in response to determining that the generated configuration is verified, the instructions further cause the processing device to update the configuration database with the specifications and supply the specifications to the machine learning engine.

In some embodiments, in response to determining that the generated configuration is not verified, the instructions further cause the processing device to receive settings as an input on the interface of the endpoint device for manual device management.

In some embodiments, the instructions further cause the processing device to transform the settings into a custom configuration using a translation engine and add the custom configuration to the configuration database.

In some embodiments, the instructions further cause the processing device to store the credentials in a credential storage device.

In another aspect, a computer program product for device configuration data generation and management via a machine learning engine is presented. The computer program product may include a non-transitory computer-readable medium including code causing an apparatus to receive credentials on an interface of an endpoint device, receive a request from the endpoint device to access a portal; authenticate the credentials via an authentication engine, receive specifications, wherein the specifications are input into the interface of the endpoint device, select, via a configuration engine comprising pre-existing configurations in a configuration database of a first storage device, a selected pre-existing configuration, determine a verification of the selected pre-existing configuration, and access the portal.

In some embodiments, in response to determining that the selected pre-existing configuration is verified, the code further causes the apparatus to update the configuration database with the specifications.

In some embodiments, in response to not determining that the selected pre-existing configuration is verified, the code further causes the apparatus to extract and transmit the specifications to a configuration generator engine including a machine learning engine, preprocess and extract relevant specification data from the specifications, generate, using the machine learning engine, a generated configuration based on and the relevant specification data, wherein the machine learning engine is trained on the pre-existing configurations, and determine a verification of the generated configuration.

In some embodiments, in response to determining that the generated configuration is verified, the code further causes the apparatus to update the configuration database with the specifications and supply the specifications to the machine learning engine.

In some embodiments, in response to determining that the generated configuration is not verified, the code further causes the apparatus to receive settings as an input on the interface of the endpoint device for manual device management.

In some embodiments, the code further causes the apparatus to transform the settings into a custom configuration using a translation engine, and add the custom configuration to the configuration database.

In some embodiments, the code further causes the apparatus to store the credentials in a credential storage device.

In yet another aspect, a method for device configuration data generation and management via a machine learning engine is presented. The method may include receiving credentials on an interface of an endpoint device, receiving a request from the endpoint device to access a portal, authenticating the credentials via an authentication engine, receiving specifications, wherein the specifications are input into the interface of the endpoint device, selecting, via a configuration engine comprising pre-existing configurations in a configuration database of a first storage device, a selected pre-existing configuration, determining a verification of the selected pre-existing configuration, and accessing the portal.

In some embodiments, in response to determining that the selected pre-existing configuration is verified, the method further may include updating the configuration database with the specifications.

In some embodiments, in response to not determining that the selected pre-existing configuration is verified, the method further may include extracting and transmitting the specifications to a configuration generator engine including a machine learning engine, preprocessing and extracting relevant specification data from the specifications, generating, using the machine learning engine, a generated configuration based on and the relevant specification data, wherein the machine learning engine is trained on the pre-existing configurations, and determining a verification of the generated configuration.

In some embodiments, in response to determining that the generated configuration is verified, the method further may include updating the configuration database with the specifications and supplying the specifications to the machine learning engine.

In some embodiments, in response to determining that the generated configuration is not verified, the method further may include receiving settings as an input on the interface of the endpoint device for manual device management.

In some embodiments, the method further may include transforming the settings into a custom configuration using a translation engine, and adding the custom configuration to the configuration database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
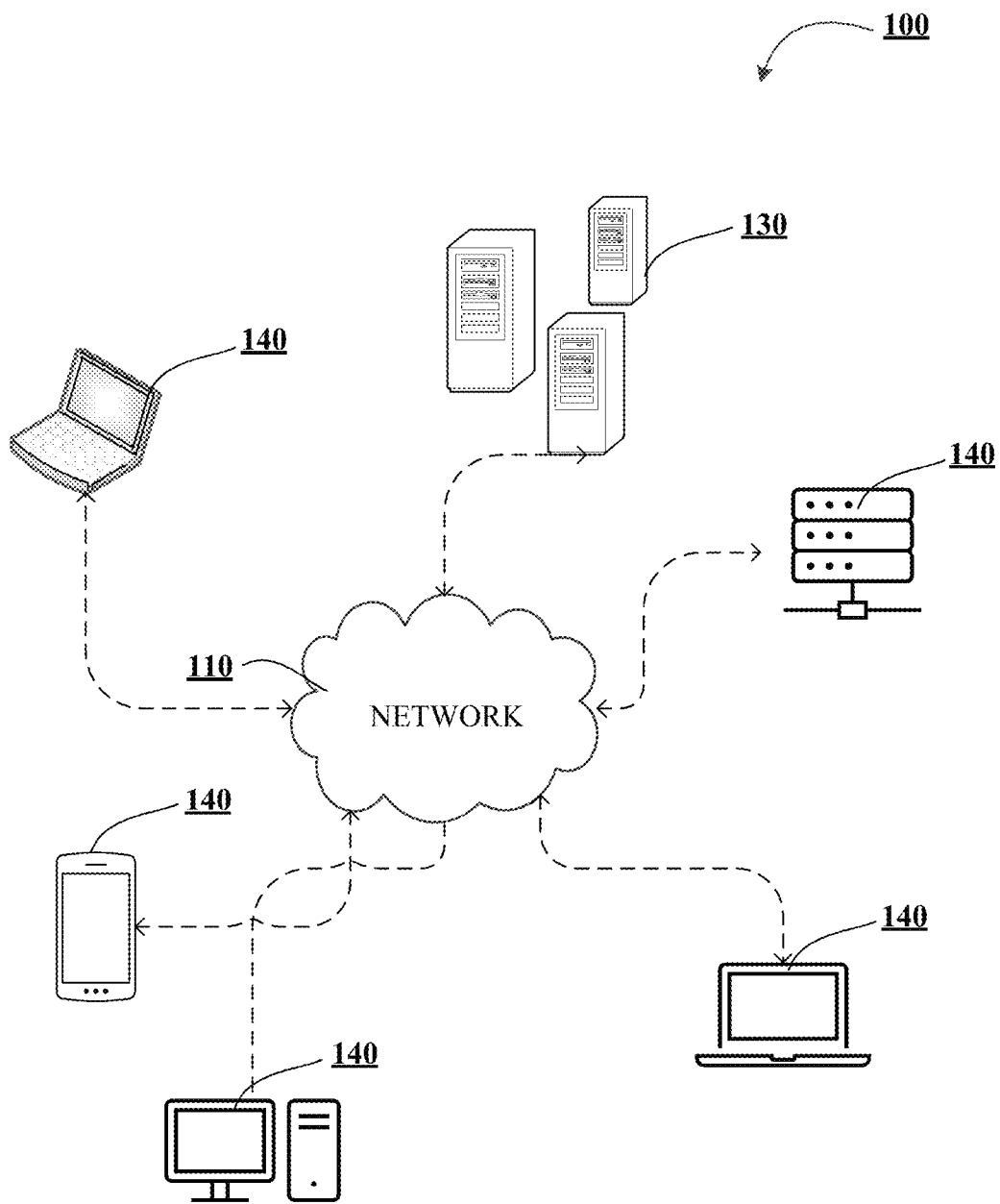
Figure 1B:
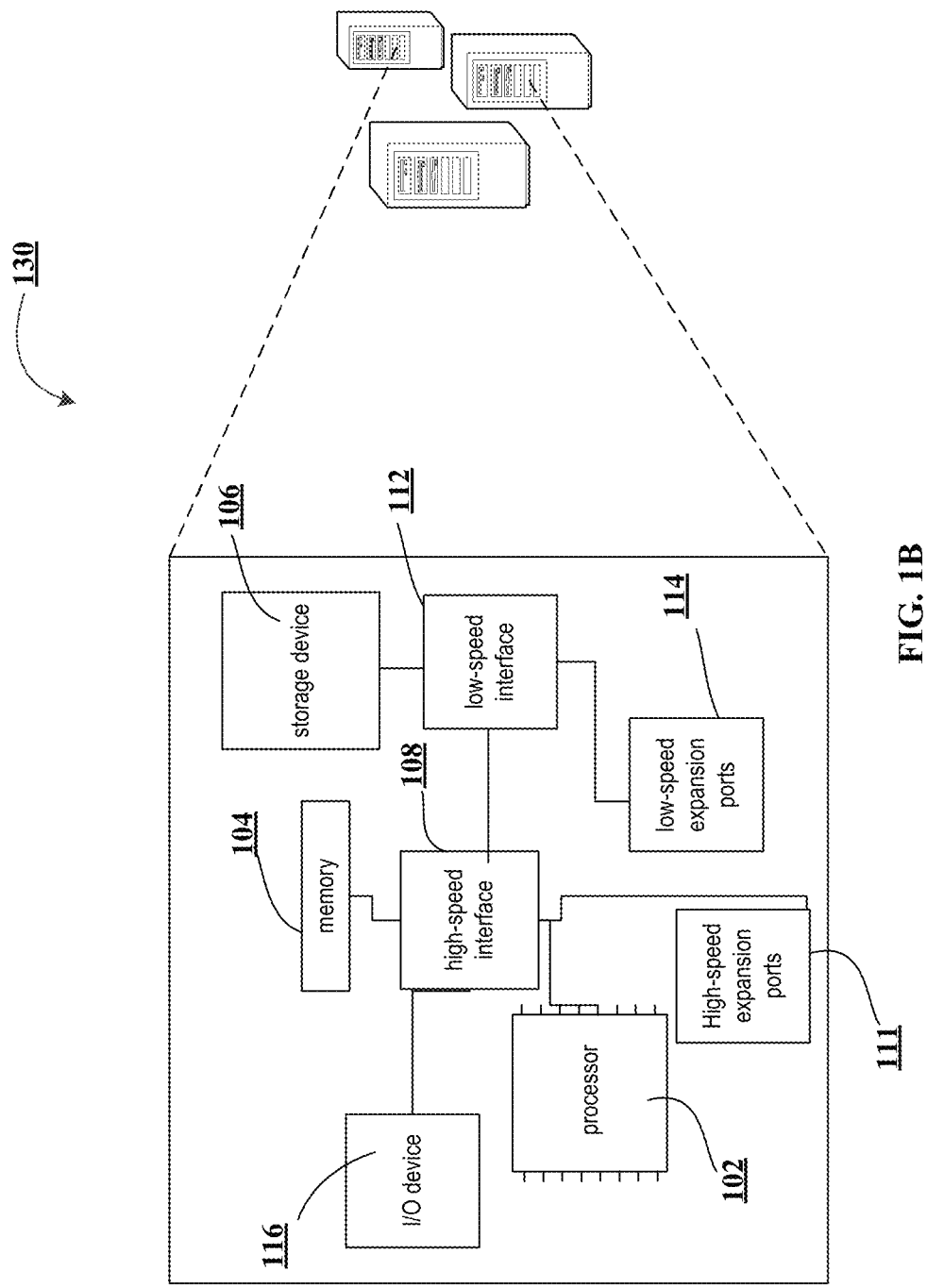
Figure 1C:
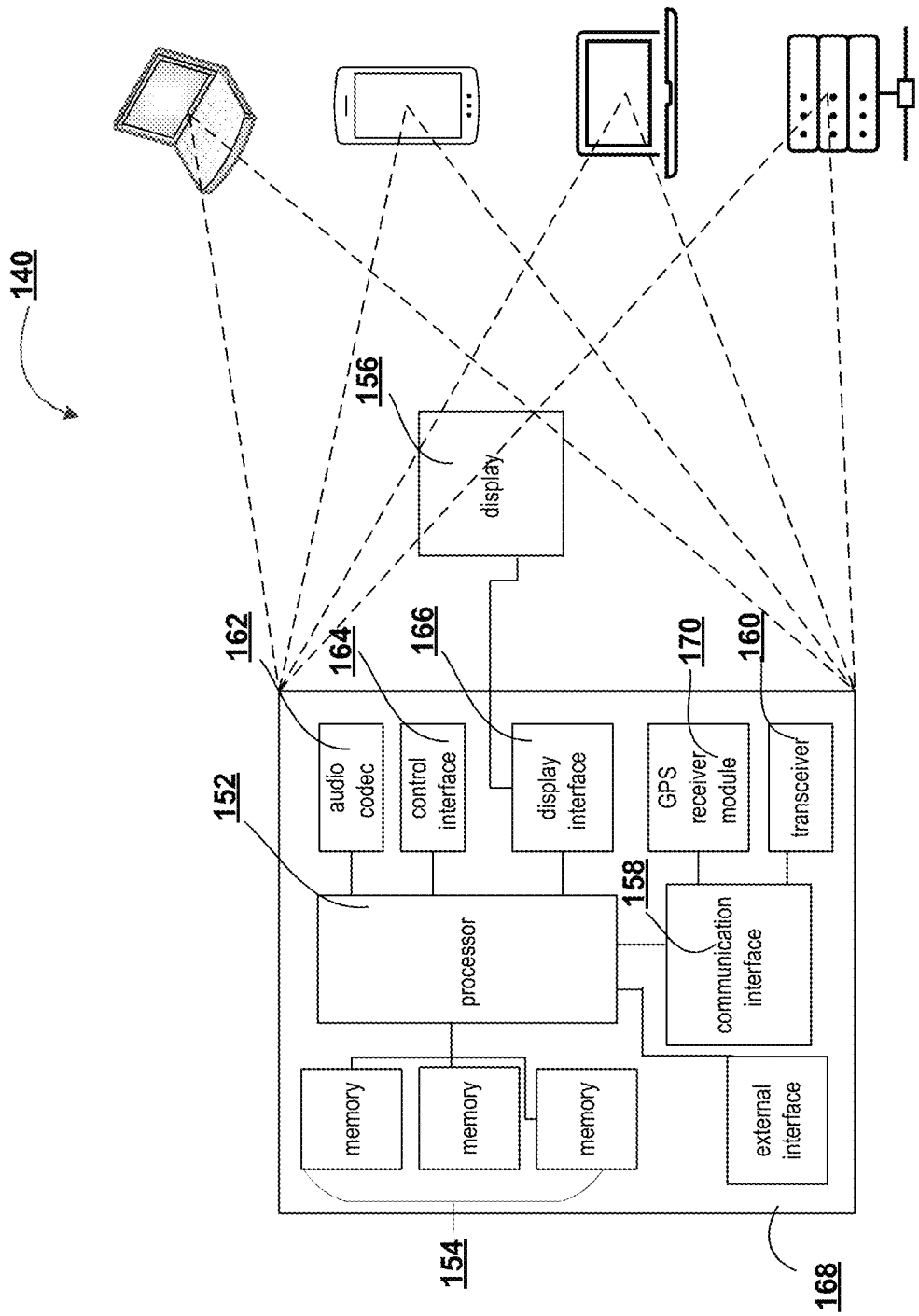
Figure 2:
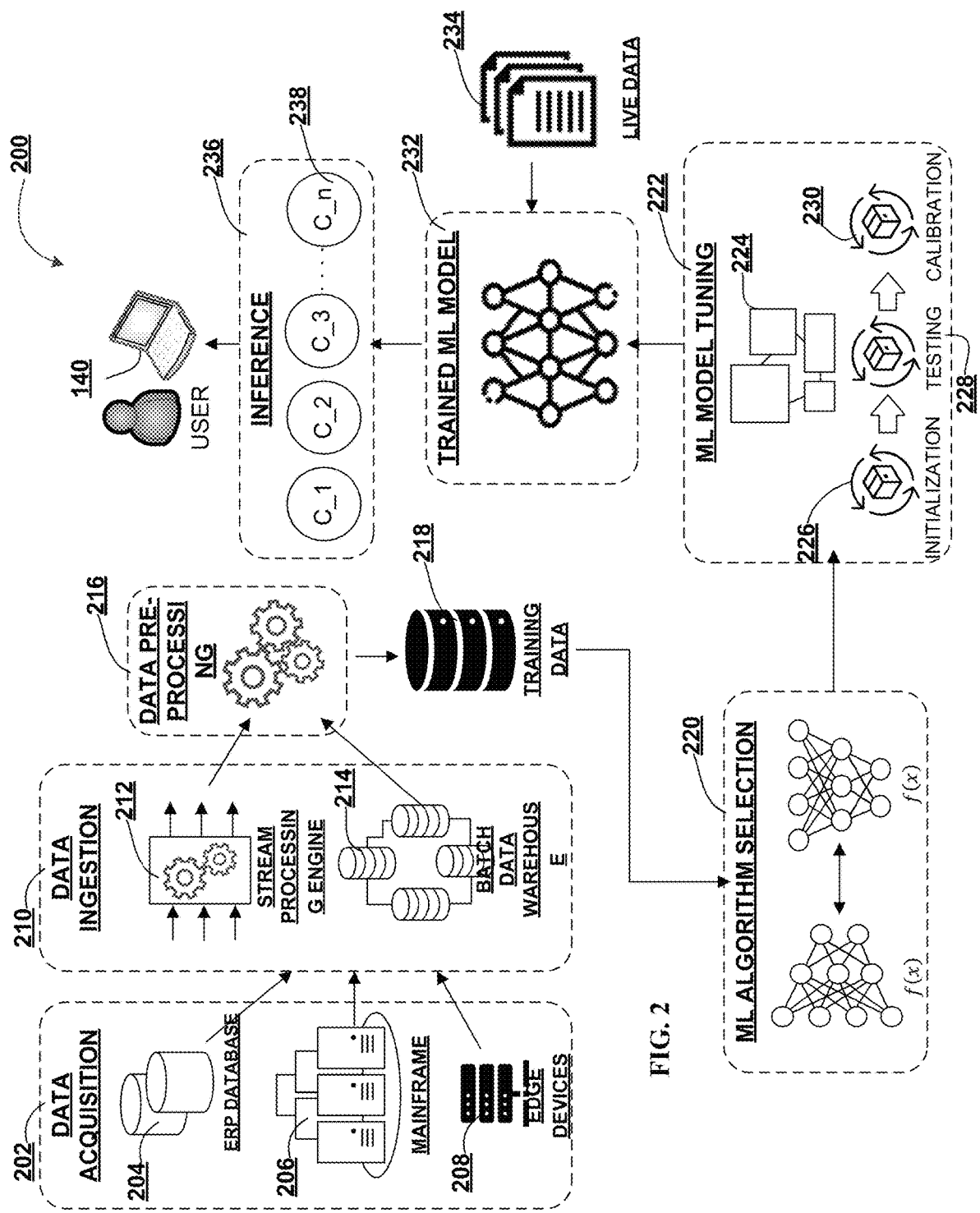
Figure 3A:
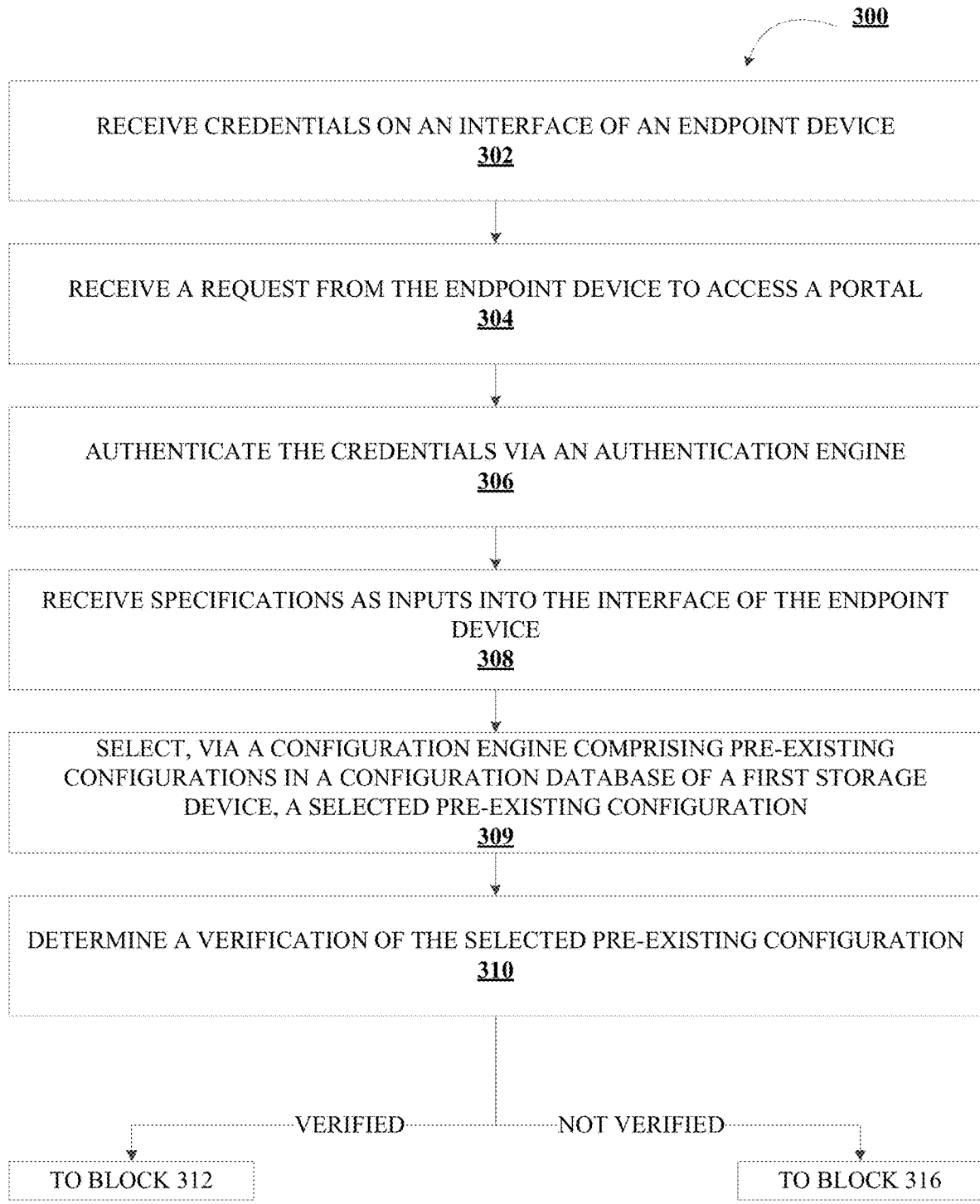
Figure 3B:
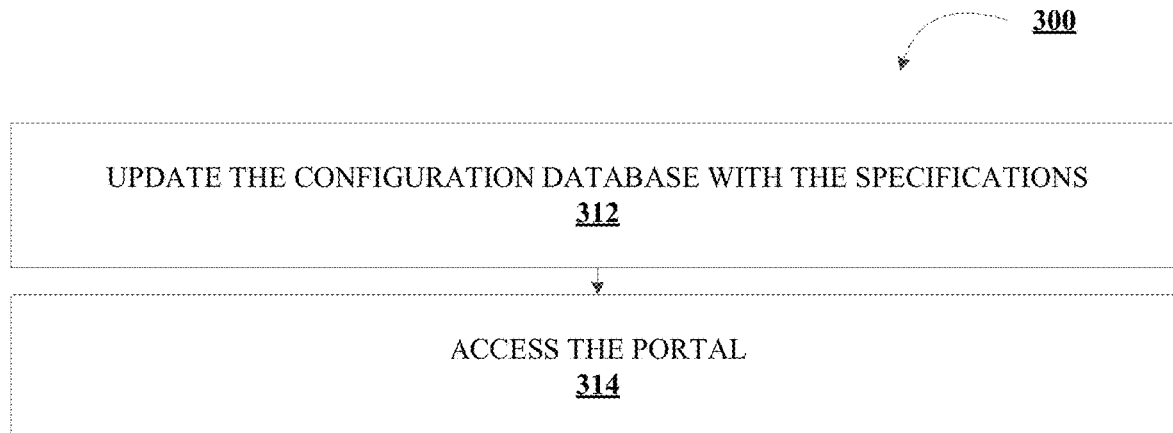
Figure 3C:
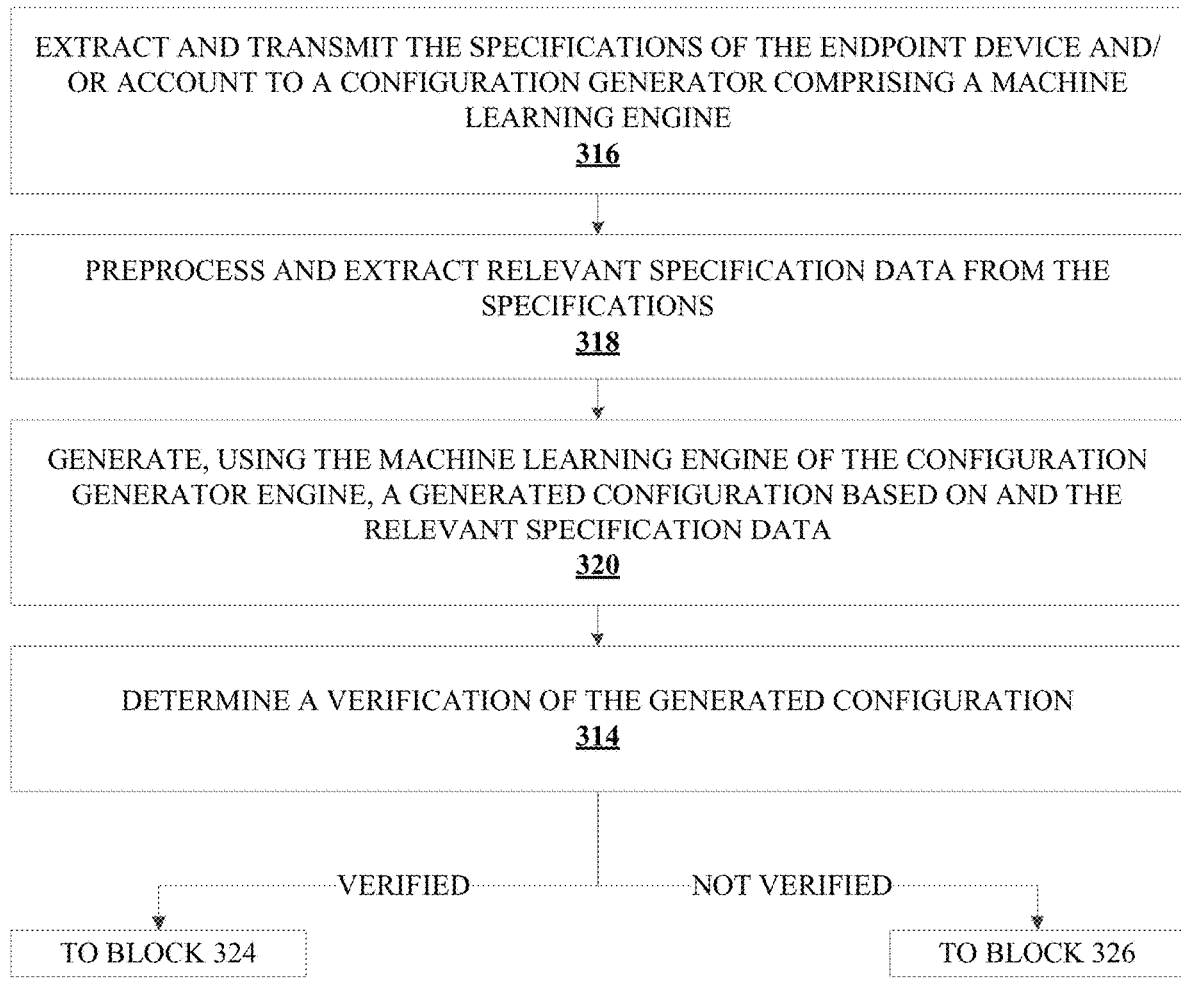
Figure 3D:
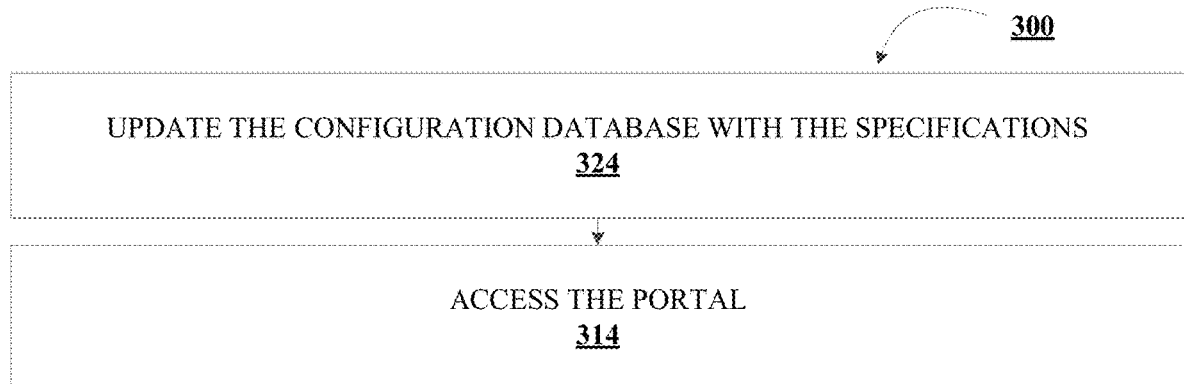
Figure 3E:
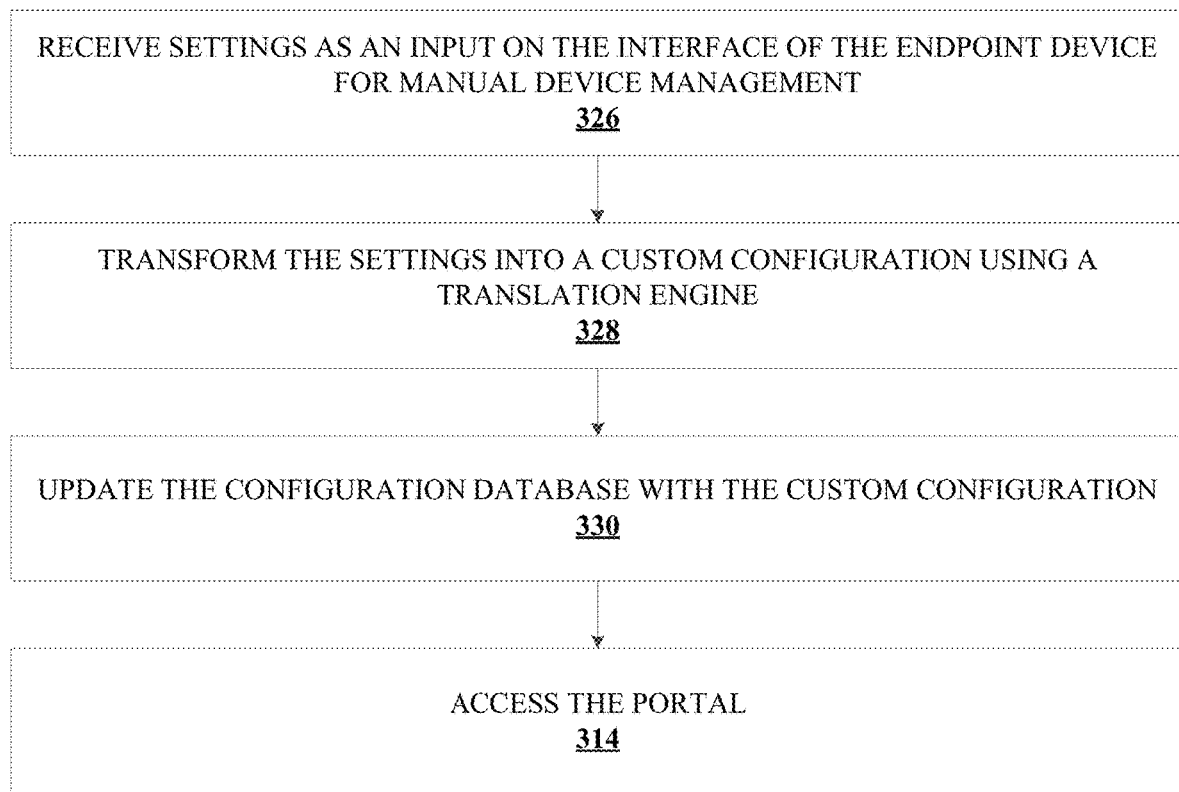
Figure 4:
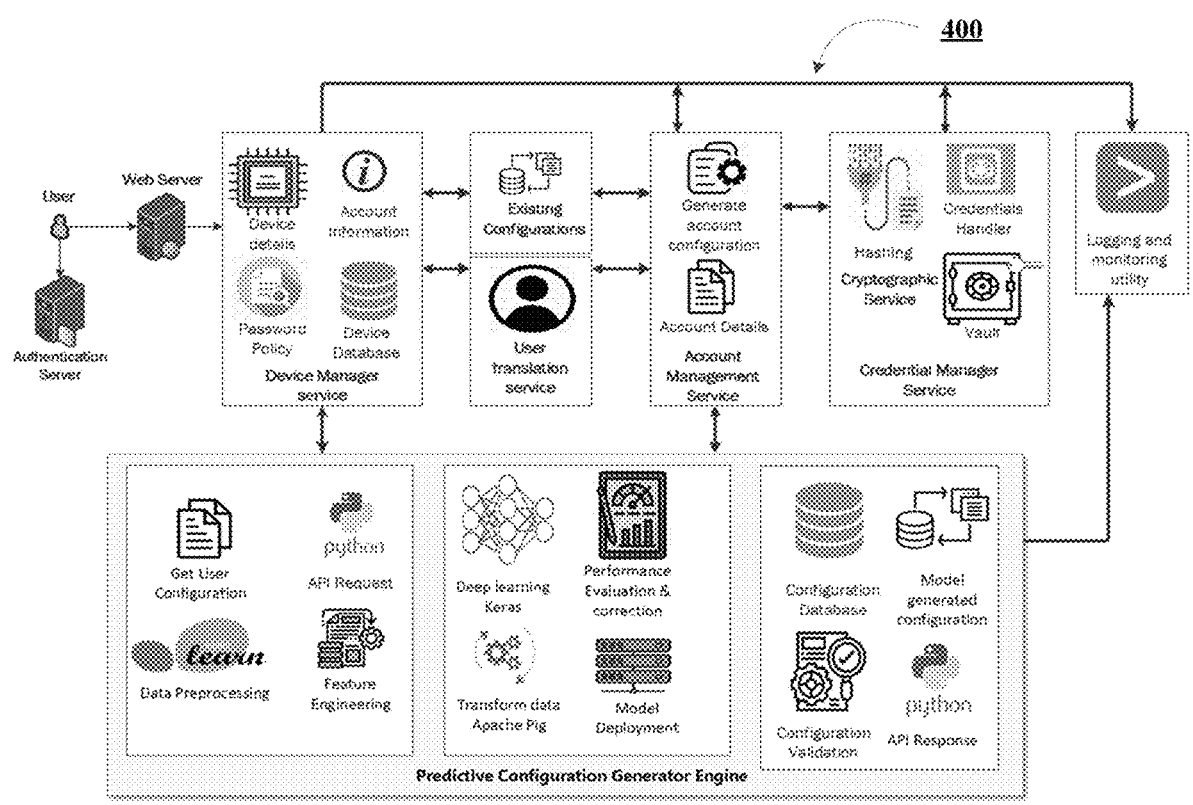
Figure 5:
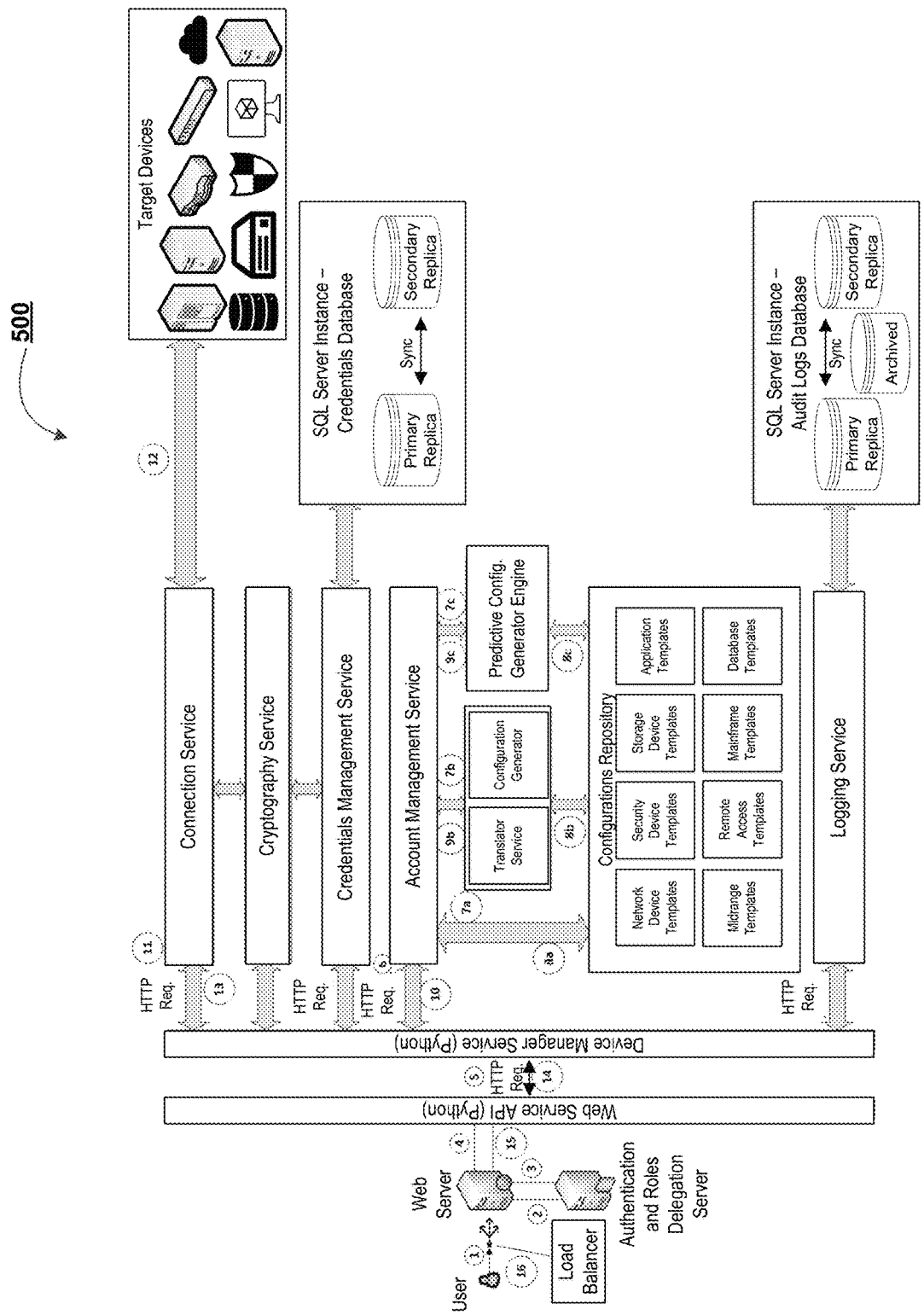

Having thus described embodiments of the invention in general terms, reference will now be made the accompanying drawings, wherein:

FIGS. 1A-1C illustrate technical components of an exemplary distributed computing environment for device configuration data generation and management via a machine learning engine, in accordance with an embodiment of the invention;

FIG. 2 illustrates an exemplary machine learning subsystem architecture, in accordance with an embodiment of the invention;

FIGS. 3A-3E illustrate a process flow for device configuration data generation and management via a machine learning engine, in accordance with an embodiment of the invention;

FIG. 4 illustrates an exemplary architecture structure for device configuration data generation and management via a machine learning engine, in accordance with an embodiment of the invention; and FIG. 5 illustrates an exemplary architecture structure for device configuration data generation and management via a machine learning engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "interface" may be any device or software that allows a user to input information, such as commands or data, into a device, or that allows the device to output information to the user. For example, the interface includes a graphical user interface (GUI) or an interface to input computer-executable instructions that direct a processing device to carry out specific functions. The interface typically employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "configuration" may refer to the set of settings and parameters that govern the management and vaulting of accounts on an endpoint device. A configuration establishes the rules, permissions, and options to ensure efficient and secure account handling. Account creation is governed by the configuration, specifying mandatory fields and criteria such as username, password complexity rules, and additional information like email addresses or security questions. Access control is implemented through the configuration, determining authorized individuals responsible for managing and modifying accounts, often based on role-based access control principles. Account permissions are defined within the configuration, granting specific actions and operations to account holders, thereby ensuring appropriate data access and manipulation. In some embodiments, the configuration provides guidance on password management, including password policies, requirements, expiration periods, and reset procedures, bolstering account security. In some embodiments, to mitigate unauthorized access, the configuration may incorporate account lockout mechanisms triggered by a predetermined number of failed login attempts. In some embodiments, the configuration may also facilitate the auditing and logging by enabling tracking of account activities, enhancing security monitoring and incident investigation capabilities. In some embodiments, in the context of account vaulting, the configuration governs the secure storage and protection of sensitive account information, encompassing encryption settings, access controls, and mechanisms for securely storing and retrieving account credentials.

As used herein, a "translation engine" or "translation service" may refer to component or a system that facilitates the translation or conversion of configuration data or formats between different systems or environments. This overcomes configuration discrepancies, differing syntax, or incompatible data structures between systems. By providing a standardized format or protocol, a translation service enables different systems to communicate and exchange configuration information effectively. In some embodiments, the translation engine may engage in format conversion to convert configuration data from one format to another, ensuring compatibility between different systems. For example, translating configuration files from XML to JSON or YAML. In some embodiments, the translation engine may engage in protocol adaptation to enable communication between systems that use different protocols. For example, translating configuration messages from HTTP to MQTT or vice versa.

As used herein, "credentials" or "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

Before the invention described herein, the state of technology in addressing the management and access of administrative accounts for various devices within organizations was inadequate. The prevailing problem was the growing vulnerability of sharing confidential information, compromising data integrity, and encountering errors due to the manual management of devices. Organizations faced difficulties in continuously monitoring the persistent access to these devices, leaving them vulnerable to security breaches. Moreover, the existing vaulting solution lacked automation, requiring manual intervention for configuring device settings to manage accounts effectively. The complex nature of connecting and managing multiple devices in a large environment further exacerbated the challenge. Additionally, the testing and certification process for devices involved significant manual efforts before their accounts could be securely vaulted and deployed.

The problem at hand necessitates finding a solution to address the gaps in managing and accessing administrative accounts for various devices in organizations. These gaps primarily arise from the vulnerabilities associated with persistent device access, lack of continuous monitoring, and manual intervention required for configuring device settings. The complex nature of connecting and managing diverse devices in a large environment, along with the associated security vulnerabilities, needs to be effectively resolved. Moreover, the labor-intensive testing and certification process for devices before their accounts can be securely deployed poses additional challenges. Therefore, there is an immediate need for an innovative solution that can streamline and automate the management and access of administrative accounts while addressing the security vulnerabilities, complexity, and manual efforts involved in the current device management landscape.

The present disclosure reflects the discovery of a novel solution that uses a configuration generator engine to dynamically generate and manage device configurations for efficient account management. This technology enables the creation of custom configuration templates that include a set of instructions for managing accounts on devices. By utilizing basic device identifying details provided by the user in real-time, this system significantly reduces the need for excessive human intervention. By applying deep learning algorithms, this system can automatically learn features from a configurations database, enhancing its predictive capabilities, thereby mitigating the vulnerabilities associated with sharing persistent access by establishing a centralized repository for all device configuration information pertaining to account management. These features offer a secure and efficient end-to-end enterprise solution for account vaulting, management, and certification on both new and existing physical or virtual devices. Moreover, the system enables faster onboarding and offboarding of accounts, secure account management, and reduced dependency on manual interventions. Every user activity is monitored and logged for audit purposes, ensuring comprehensive accountability. To further enhance security, the solution incorporates automated account credential rotation, thereby safeguarding sensitive information even after a task is completed or the checkout duration expires.

Specifically, the present disclosure introduces a system, computer program product, and method for device configuration data generation and management via a machine learning engine. The process begins with a user requesting access to a portal through an interface and providing their credentials for authentication. Once authenticated, the user is prompted to input the details of the device they wish to access. At this point, the system selects pre-existing configurations from a configuration database and applies them using a configuration engine. The verification of the pre-existing configuration is determined. If the pre-existing configuration is verified, the configuration database is updated with the device details. However, if the pre-existing configuration is not verified, the system extracts specifications of the device, including information about the device itself, the tools required, and connectivity details, and stores them in a database. These specifications are then transmitted to a configuration generator engine, which incorporates a deep learning algorithm and a translation engine. The relevant specification data is extracted and preprocessed from the specifications, and a configuration is generated based on this information. The generated configuration then undergoes validation. If validated, the configuration database is updated with the device information, and the information is fed to the machine learning engine for further enhancement. If the generated configuration is not validated, the user is prompted to provide manual device management settings through the interface. These settings are transformed into a custom configuration using a translation engine, and the custom configuration is added to the configuration database for future use.

What is more, the present invention provides a technical solution to a technical problem. As described herein, the technical problem includes inadequate technology to manage and access administrative accounts for devices in entities, the current solutions for which result in continuous monitoring and complex device management practices. The technical solution presented herein allows for the prediction and creation of configurations to manage accounts on devices. In particular, the system is an improvement over existing device configuration management systems by managing and certifying accounts on new or existing devices (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for device configuration data generation and management via a machine learning engine, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning engine (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning engine 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning engine 224 using the training data 218 to make predictions or decisions without explicitly being programmed to do so. The machine learning engine 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given supplyback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning engine type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning engine, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning engine 232 is one whose hyperparameters are tuned and model accuracy maximized.

The trained machine learning engine 232, similar to any other software application output, can be persisted to storage, file, memory, or application, or looped back into the processing component to be reprocessed. More often, the trained machine learning engine 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning engines trained using supervised learning algorithms may be used to structure computations in terms of categorized outputs (e.g., $C\_1$, $C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning engines trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1$, $C\_2 \ldots C\_n$ 238) to live data 234, such as in classification, and/or the like. These categorized outputs, groups (clusters), or labels are then presented to the user input system 130. In still other cases, machine learning engines that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIGS. 3A-3E illustrate a process flow for device configuration data generation and management via a machine learning engine, in accordance with an embodiment of the invention;

As shown in block 302, the system 130 receives credentials on an interface of an endpoint device 140. This may occur as a result of the system 130 prompting a user for authentication credentials, or the system 130 receiving the authentication credentials in a passive manner, such as a swipe of a keycard, presenting dialog boxes on an interface for receiving of a username and password, fingerprint, retinal scan, and so forth.

After the credentials have been provided to the system 130, and as shown in block 304, the system 130 receives a request from the endpoint device 140 to access a portal. Such a request may be transmitted to the system 130 as a result of the presentation or entry of the credentials to the endpoint device 140, for example, as a result of scanning a badge, or as a result of a confirmation provided by a user of credential entry, for example, clicking a "submit" button on the interface of the endpoint device 140.

As shown in block 306, the system 130 then authenticates the credentials via an authentication engine to provide a signed token. To authenticate credentials and provide a signed token, the system 130 verifies them by comparing them to the stored user information in a credentials database or a Lightweight Directory Access Protocol ("LDAP") directory used for accessing and managing directory information services. Once the credentials are confirmed, the system 130 may then generate a token. This token may include relevant information such as a user's identity or role within an organization and permissions. A cryptographic algorithm may generate a signature based on the token's content and a private key. Once signed, the token is delivered back to the endpoint device 140 as a response to their authentication request.

In some embodiments, subsequent requests for authentication, the system 130 may verify the token's authenticity by using a corresponding public key. LDAP may then be utilized during the token verification phase to retrieve additional user information or access permissions stored in the directory service. Upon successful verification, the system 130 grants the user access to the requested resources or services based on the permissions associated with their identity stored within the token.

Next, as shown in block 308, the system 130 receives specifications as inputs into the interface of the endpoint device 140. The inputs, provided to a form presented on the interface of the endpoint device 140, collects details pertaining to the endpoint device 140 accessed by the user through the interface. The form may request specifications such as the endpoint device's unique identifier, make, model, operating system, software version, network information, and hardware specifications. In some embodiments, the form may also request information about a user's account associated with the endpoint device 140, including but not limited to username, email address, and contact details. The form displays fields or prompts for the requested specifications, allowing the user to enter or select the relevant data. In some embodiments, the system 130 may display on the interface of the endpoint device 140 prompts and corresponding answer input boxes, checkbox selections, dropdown menus, radio buttons, or any suitable combination thereof, to allow for the indication of the specifications to be input into the interface, which are then received by the system 130 for further analysis as described herein.

In other embodiments, in lieu of provided a form to be completed by a user, the specifications may be extracted from the endpoint device 140 by the system 130. These specifications may include the device's unique identifier, make, model, operating system, software version, network information, and hardware specifications. In some embodiments, the system 130 may also extract information about a user's account associated with the endpoint device 140, including but not limited to username, email address, and contact details. The specifications may be extracted by the system 130 using various techniques such as querying the endpoint device's operating system 130 for relevant information or accessing system logs.

As shown in block 309, the system 130 then selects, via a configuration engine comprising pre-existing configurations in a configuration database of a first storage device, a selected pre-existing configuration. Given the responses input at the interface of the endpoint device 140 the system 130 may compare the input(s) containing the specifications with the configurations stored in a configuration database (i.e., pre-existing configurations).

For example, "Device Location A" and "Computer Manufacturer B" may be input at the interface of the endpoint device 140 as specifications. Subsequently, the configuration engine parses the configuration database for pre-existing configurations that also are related to Device Location A and/or Computer Manufacturer B. Such specification data may be linked to the preexisting configurations as metadata or characteristics of the pre-existing configurations identified in the configuration database.

It shall be appreciated that at least a portion of the specifications should match the specification data of the pre-existing configurations. However, the extent to which a match is found is predetermined. For example, in some embodiments, the configuration engine parses the configuration database for pre-existing configurations and identifies a match of a preexisting configuration even if the preexisting configuration only refers to Device Location A. In other embodiments, the configuration engine parses the configuration database for pre-existing configurations and identifies a match of a preexisting configuration even if the preexisting configuration only refers to Computer Manufacturer B. In yet additional embodiments, the configuration engine parses the configuration database for pre-existing configurations and identifies a match of a preexisting configuration even if the preexisting configuration only refers to both Device Location A and Computer Manufacturer B.

In some embodiments, the pre-existing configuration is selected based on which of the pre-existing configurations in the configuration database that has the highest number of matching specifications. The system 130 compares the specifications, such as endpoint device 140 model, operating system version, screen resolution, and other relevant specifications, with the corresponding details stored in the configuration database. By evaluating the number of matching specifications, the system 130 determines which pre-existing configuration aligns most closely.

In other embodiments, a pre-existing configuration is only selected if every one of the specifications entered at the endpoint device 140 matches with a pre-existing configuration. Additionally, or alternatively, a user may be presented via the interface of an endpoint device 140 with one or more potentially selectable pre-existing configurations. Thereafter, at the discretion of a user associated with the entity, a pre-existing configuration may be selected if the user determines so.

However, a user associated with the entity may elect to not select any of the pre-existing configurations from the one or more pre-existing configurations. In such embodiments, the process may continue at block 316.

Otherwise, in embodiments where there is a selected pre-existing configuration, the process will proceed to block 310 where the selected pre-existing configuration is verified (e.g., determined to be verified) or in other words, tested to determine if the selected pre-existing configuration is successful at managing the account associated with the user and the endpoint device 140.

The verification (or "validation") of the selected pre-existing configuration is accomplished by the system 130 checking, after the account is configured using the selected pre-existing configuration, the account settings to determine if the account settings of the user's instance at the endpoint device 140 match what is expected of the selected pre-existing configuration. If so, verification has occurred for the selected pre-existing configuration. Additionally, or alternatively, the system 130 may determine if the correct permissions and/or access to applications have been granted as a result of the selected pre-existing configuration.

If the pre-existing configuration is verified, the configuration database is updated with the specifications as illustrated in block 312. Updating the configuration database with the specifications, even with a verified selected pre-existing configuration, is important for effective inventory management, configuration control, security monitoring, incident response, compliance adherence, and capacity planning. Entities are better able to track and manage devices, ensure consistent configurations, detect security vulnerabilities, problem-solve issues, meet compliance requirements, and plan for future needs.

Thereafter, the selected pre-existing configuration will be implemented, and the endpoint device 140 will have access to the portal, as illustrated in block 314. Although not depicted graphically in FIG. 3B, the system 130 may subsequently store the credentials in a credential storage device, such as to safeguard the credentials and maintain the integrity of the credentials for future use. Furthermore, the account may be vaulted in the credential storage device.

In embodiments where the selected pre-existing configuration is not verified in block 310, or, if no such pre-existing configuration is able to be selected in block 309, the process continues at block 316, where the system 130 extracts and transmits the specifications of the endpoint device 140 and/or account to a configuration generator comprising a machine learning engine 232. In some embodiments, the specifications are the specifications identified in block 308. In other words, if the specifications are input manually into a form in block 308, in some embodiments these same manually entered specifications are transmitted to the configuration generator engine in block 316. Similarly, if the specifications are extracted by the system 130 in block 308, in some embodiments these same extracted specifications are transmitted to the configuration generator engine in block 316. However, in other embodiments, if the specifications are manually input into a form in block 308, the system 130 may instead extract from the endpoint device 140 the specifications in block 316.

The configuration generator includes a machine learning engine 232, such as a deep learning algorithm (e.g., a restricted Boltzmann machine, a deep belief network method, a convolution network method, a stacked auto-encoder method, etc.). The machine learning engine 232 of the configuration generator engine, having been trained on prior pre-existing (i.e. historical) configurations and/or successfully verified generated configurations, is structured to predictively generate a generated configuration for a given endpoint device 140 given the corresponding specifications determined or provided.

To assist in such generation of a generated configuration, in some embodiments, and as shown in block 318, the system 130 may first preprocess and extract relevant specification data from the specifications, such as to clean the data associated with the specifications and increase the accuracy of the output of the configuration generator engine.

The relevant specification data may be predetermined by a user associated with the entity. For example, it may be predetermined that only endpoint device 140 model, operating system version, and screen resolution are the most valuable specifications, and any other specifications collected or input may be discarded. Accordingly, this cleaned data associated with the specifications is referred to herein as "relevant specification data."

Thereafter, in some embodiments, the relevant specification data may be preprocessed. Preprocessing may include removing duplicate entries, handling missing values by imputation or deletion, correcting inconsistent formatting, standardizing variables, and eliminating outliers. In some embodiments, noisy features may be removed, and text data may undergo preprocessing steps like tokenization. Each pre-processing function minimize any biases that may affect the performance of the machine learning model.

Next, as shown in block 320, the system 130 may then generate, using the machine learning engine 232 of the configuration generator engine, a generated configuration based on and the relevant specification data. By providing the machine learning engine 232 the relevant specification data, the machine learning engine 232 outputs a generated configuration determined by the machine learning engine 232 to be the most likely configuration to be associated with the endpoint device 140 and user. The machine learning model is trained using the procedure set forth in FIG. 2, while, as will be discussed hereinafter, various additional configurations are fed to the machine learning model over time to improve the accuracy of the generated configurations output by the machine learning model.

Next, as shown in block 322, the system 130 may then determine a verification of the generated configuration. The verification (or "validation") of the generated configuration is accomplished by the system 130 checking, after the account is configured using the generated configuration, the account settings to determine if the account settings of the user's instance at the endpoint device 140 match what is expected of the generated configuration. If so, verification has occurred for the generated configuration. Additionally, or alternatively, the system 130 may determine if the correct permissions and/or access to applications have been granted as a result of the generated configuration.

If verification occurs, the process may proceed to block 324. In block 324, the system 130 updates the configuration database with the specifications. In some embodiments, the system 130 updates the configuration database with the generated configuration and the corresponding specifications, such as to refer to the generated configuration at a later instance and thus avoid the regeneration of the configuration using the configuration generator engine for instances where similar specifications are provided to the system 130 in the future. Moreover, these specifications and resulting generated configuration are fed to the machine learning engine 232 for the purposes of more accurate generation during future uses of the machine learning engine 232. Thereafter, the endpoint device 140 is granted access to the portal in block 314.

If, however, verification does not occur, indicating that the generated configuration is not suitably adapted to the given account or endpoint device 140, or if the configuration generation engine is not available or functional, the process may instead proceed at block 326.

As shown in block 326, in response to determining that the generated configuration is not verified, the system 130 receives settings as an input on the interface of the endpoint device 140 for manual device management. It shall be appreciated that in some embodiments, manual entry of the configuration may be necessary, such as is the case when both the configuration engine and the configuration generator engine are unable to provide a configuration that can be verified.

Accordingly, in some embodiments, the system 130 may then prompt, via the interface of the endpoint device 140, for entry of settings. Settings may be selected or chosen through a form on the interface of the endpoint device 140. Examples of such settings include, but are not limited to, device identification details, such as the model, serial number, or unique identifier, network configuration settings such as Wi-Fi network name, password, and IP address configuration. Furthermore, security settings, such as passwords, encryption, or two-factor authentication, may need to be specified. Other settings may involve setting preferences like language, time zone, display brightness, or power-saving options. Data and storage management settings, integration and connectivity details, privacy agreements, and device testing may also be part of the form, although the specific settings can vary depending on the device and its intended use. These settings are selected on the interface, then transmitted to the system 130 in order to manage the device according to the settings.

As shown in block 328, the system 130 may then transform the settings into a custom configuration using a translation engine. The translation engine (i.e., a "translation service"), with the ability to translate the settings into a custom configuration for the endpoint device 140, does so by generating the custom configuration as a configuration file. Then, as illustrated in block 330, the system 130 saves this custom configuration by adding it to the configuration database. In this way, future needs for configurations related to the custom configuration may be better automated, such as through the configuration engine and the configuration generator engine as previously described in detail. Thereafter, the system 130 then grants access to the portal as shown in block 314.

FIGS. 4 and 5 illustrate exemplary architecture structures for device configuration data generation and management via a machine learning engine, in accordance with embodiments of the invention. As shown in FIG. 4, a user may interact with the authentication server (e.g., authentication engine) through an endpoint device 140, which then initiates the system 130 described herein. A device manager may include device details, account information, password policies, and a device database. The account management service may generate account configurations using stored account details. The authentication engine may include hashing, cryptographic services, and a credential handler. The configuration generator engine may include data pre-processing, an API request engine, feature engineering, and the ability to retrieve user configurations. It may also include a deep learning algorithm with performance evaluation and corrections, transformation of data and model deployment. Furthermore, by referencing the configuration database, the configuration generator engine generates model configurations and validates.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator—and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for device configuration data generation and management, the system comprising:
   a processing device; and
   a non-transitory storage device comprising instructions that, when executed by the processing device, causes the processing device to perform the steps of:
   receive credentials on an interface of an endpoint device;
   receive a request from the endpoint device to access a portal;
   authenticate the credentials via an authentication engine;
   receive specifications comprising endpoint device attributes, wherein the specifications are input into the interface of the endpoint device;
   select, via a configuration engine comprising pre-existing configurations in a configuration database, a selected pre-existing configuration based on the specifications;
   determine a verification of the selected pre-existing configuration, wherein the verification of the selected pre-existing configuration comprises determining when account settings at the endpoint device match those of the selected pre-existing configuration, wherein in response to not determining that the selected pre-existing configuration is verified, the instructions further cause the processing device to:
   extract and transmit the specifications to a configuration generator engine comprising a machine learning engine;
   preprocess and extract relevant specification data from the specifications;
   generate, using the machine learning engine, a generated configuration based on and the relevant specification data, wherein the machine learning engine is trained on the pre-existing configurations; and
   determine a verification of the generated configuration, wherein the verification of the generated configuration comprises determining when account settings match those of the generated configuration;
   update the configuration database with the specifications and supply the specifications to the machine learning engine; and
   access the portal upon a condition where the verification of the selected preexisting configuration or the verification of the generated configuration is affirmed.

2. The system of claim 1, wherein in response to determining that the selected pre-existing configuration is verified, the instructions further cause the processing device to:
   update the configuration database with the specifications.

3. The system of claim 1, wherein in response to determining that the generated configuration is not verified, the instructions further cause the processing device to:
   receive settings as an input on the interface of the endpoint device for manual device management.

4. The system of claim 3, wherein the instructions further cause the processing device to:
   transform the settings into a custom configuration using a translation engine; and
   add the custom configuration to the configuration database.

5. The system of claim 1, wherein the instructions further cause the processing device to:
   store the credentials in a credential storage device.

6. A computer program product for device configuration data generation and management, the computer program product comprising a non-transitory computer-readable medium comprising code causing an apparatus to:
   receive credentials on an interface of an endpoint device;
   receive a request from the endpoint device to access a portal;
   authenticate the credentials via an authentication engine;
   receive specifications comprising endpoint device attributes, wherein the specifications are input into the interface of the endpoint device;
   select, via a configuration engine comprising pre-existing configurations in a configuration database, a selected pre-existing configuration based on the specifications;
   determine a verification of the selected pre-existing configuration, wherein the verification of the selected pre-existing configuration comprises determining when account settings at the endpoint device match those of the selected pre-existing configuration, wherein in response to not determining that the selected pre-existing configuration is verified, the code further causes the apparatus to:
   extract and transmit the specifications to a configuration generator engine comprising a machine learning engine;
   preprocess and extract relevant specification data from the specifications;
   generate, using the machine learning engine, a generated configuration based on and the relevant specification data, wherein the machine learning engine is trained on the pre-existing configurations; and
   determine a verification of the generated configuration, wherein the verification of the generated configuration comprises determining when account settings match those of the generated configuration;
   update the configuration database with the specifications and supply the specifications to the machine learning engine; and
   access the portal upon a condition where the verification of the selected preexisting configuration or the verification of the generated configuration is affirmed.

7. The computer program product of claim 6, wherein in response to determining that the selected pre-existing configuration is verified, the code further causes the apparatus to:
update the configuration database with the specifications.

8. The computer program product of claim 6, wherein in response to determining that the generated configuration is not verified, the code further causes the apparatus to:
receive settings as an input on the interface of the endpoint device for manual device management.

9. The computer program product of claim 8, wherein the code further causes the apparatus to:
transform the settings into a custom configuration using a translation engine; and
add the custom configuration to the configuration database.

10. The computer program product of claim 6, wherein the code further causes the apparatus to:
store the credentials in a credential storage device.

11. A method for device configuration data generation and management, the method comprising:
receiving credentials on an interface of an endpoint device;
receiving a request from the endpoint device to access a portal;
authenticating the credentials via an authentication engine;
receiving specifications comprising endpoint device attributes, wherein the specifications are input into the interface of the endpoint device;
selecting, via a configuration engine comprising pre-existing configurations in a configuration database, a selected pre-existing configuration based on the specifications;
determining a verification of the selected pre-existing configuration, wherein the verification of the selected pre-existing configuration comprises determining when account settings at the endpoint device match those of the selected pre-existing configuration, wherein in response to not determining that the selected pre-existing configuration is verified, the method further comprises:
extracting and transmitting the specifications to a configuration generator engine comprising a machine learning engine;
preprocessing and extract relevant specification data from the specifications;
generating, using the machine learning engine, a generated configuration based on and the relevant specification data, wherein the machine learning engine is trained on the pre-existing configurations; and
determining a verification of the generated configuration, wherein the verification of the generated configuration comprises determining when account settings match those of the generated configuration;
updating the configuration database with the specifications and supplying the specifications to the machine learning engine; and
accessing the portal upon a condition where the verification of the selected preexisting configuration or the verification of the generated configuration is affirmed.

12. The method of claim 11, wherein in response to determining that the selected pre-existing configuration is verified, the method further comprises:
updating the configuration database with the specifications.

13. The method of claim 11, wherein in response to determining that the generated configuration is not verified, the method further comprises:
receiving settings as an input on the interface of the endpoint device for manual device management.

14. The method of claim 13, wherein the method further comprises:
transforming the settings into a custom configuration using a translation engine; and
adding the custom configuration to the configuration database.

* * * * *